(12) United States Patent
Riza et al.

(10) Patent No.: US 8,096,704 B2
(45) Date of Patent: Jan. 17, 2012

(54) EXTREME TEMPERATURE ROBUST OPTICAL SENSOR DESIGNS AND FAULT-TOLERANT SIGNAL PROCESSING

(75) Inventors: Nabeel Agha Riza, Oviedo, FL (US); Frank Perez, Tujunga, CA (US)

(73) Assignees: Nusensors, Inc., Tujunga, CA (US); University of Central Florida, Orlando, FL (US)

( * ) Notice: Subject to any disclaimer, the term of this patent is extended or adjusted under 35 U.S.C. 154(b) by 428 days.

(21) Appl. No.: 12/468,359

(22) Filed: May 19, 2009

(65) Prior Publication Data
US 2009/0296776 A1 Dec. 3, 2009

Related U.S. Application Data

(60) Provisional application No. 61/056,203, filed on May 27, 2008.

(51) Int. Cl.
*G01J 5/02* (2006.01)
*G01K 11/00* (2006.01)
(52) U.S. Cl. ........ 374/130; 374/161; 374/120; 356/480; 356/43
(58) Field of Classification Search .................. 374/130
See application file for complete search history.

(56) References Cited

U.S. PATENT DOCUMENTS

| | | | | |
|---|---|---|---|---|
| 5,823,682 A * | 10/1998 | Betz | ............................. | 374/130 |
| 6,141,098 A * | 10/2000 | Sawatari et al. | ............... | 356/477 |
| 6,738,145 B2 * | 5/2004 | Sherrer et al. | ................ | 356/480 |
| 7,951,632 B1 * | 5/2011 | Quick et al. | .................... | 438/46 |
| 2003/0107724 A1 * | 6/2003 | Hashimoto et al. | ............ | 356/45 |
| 2006/0017932 A1 * | 1/2006 | Riza et al. | ..................... | 356/484 |
| 2008/0297808 A1 * | 12/2008 | Riza et al. | ..................... | 356/503 |

* cited by examiner

*Primary Examiner* — Amy Cohen Johnson
(74) *Attorney, Agent, or Firm* — Terry M. Sanks; Beusse Wolter Sanks Mora & Maire, P.A.

(57) ABSTRACT

Silicon Carbide (SiC) probe designs for extreme temperature and pressure sensing uses a single crystal SiC optical chip encased in a sintered SiC material probe. The SiC chip may be protected for high temperature only use or exposed for both temperature and pressure sensing. Hybrid signal processing techniques allow fault-tolerant extreme temperature sensing. Wavelength peak-to-peak (or null-to-null) collective spectrum spread measurement to detect wavelength peak/null shift measurement forms a coarse-fine temperature measurement using broadband spectrum monitoring. The SiC probe frontend acts as a stable emissivity Black-body radiator and monitoring the shift in radiation spectrum enables a pyrometer. This application combines all-SiC pyrometry with thick SiC etalon laser interferometry within a free-spectral range to form a coarse-fine temperature measurement sensor. RF notch filtering techniques improve the sensitivity of the temperature measurement where fine spectral shift or spectrum measurements are needed to deduce temperature.

16 Claims, 4 Drawing Sheets

EXTREME TEMPERATURE ROBUST OPTICAL SENSOR DESIGNS AND FAULT-TOLERANT SIGNAL PROCESSING

SPECIFIC DATA RELATED TO INVENTION

This application claims the benefit of U.S. Provisional Application No. 61/056,203 filed May 27, 2008, incorporated herein by reference.

This invention was made with United States Government support awarded by the following agencies: US Department of Energy (DOE) Grant No: DE-FC26-03NT41923. The United States has certain rights in this invention.

FIELD OF INVENTION

There are numerous vital sensing scenarios in commercial and defense sectors where the environment is extremely hazardous. Specifically, the hazards can be for instance due to extreme temperatures, extreme pressures, highly corrosive chemical content (liquids, gases, particulates), nuclear radiation, biological agents, and high Gravitational (G) forces. Realizing a sensor for such hazardous environments remains to be a tremendous engineering challenge. One specific application is fossil fuel fired power plants where combustors and turbines typically have temperatures and pressures exceeding 1000° C. and 50 Atmospheres (atm). Future clean design zero emission power systems are expected to operate at even high temperatures and pressures, e.g., >2000° C. and >400 atm [J. H. Ausubel, "Big Green Energy Machines," The Industrial Physicist, AIP, pp. 20-24, October/November, 2004.] In addition, coal and gas fired power systems produce chemically hazardous environments with chemical constituents and mixtures containing for example carbon monoxide, carbon dioxide, nitrogen, oxygen, sulphur, sodium, and sulphuric acid. Over the years, engineers have worked very hard in developing electrical high temperature sensors (e.g., thermo-couples using platinum and rodium), but these have shown limited life-times due to the wear and tear and corrosion suffered in power plants [R. E. Bentley, "Thermocouple materials and their properties," Chap. 2 in *Theory and Practice of Thermoelectric Thermometry. Handbook of Temperature Measurement*, Vol. 3, pp. 25-81, Springer-Verlag Singapore, 1998].

Researchers have turned to optics for providing a robust high temperature sensing solution in these hazardous environments. The focus of these researchers have been mainly directed in two themes. The first theme involves using the optical fiber as the light delivery and reception mechanism and the temperature sensing mechanism. Specifically, a Fiber Bragg Grating (FBG) present within the core of the single mode fiber (SMF) acts as a temperature sensor. Here, a broadband light source is fed to the sensor and the spectral shift of the FBG reflected light is used to determine the temperature value. Today, commercial FBG sensors are written using Ultra-Violet (UV) exposure in silica fibers. Such FBG sensors are typically limited to under 600° C. because of the instability of the FBG structure at higher temperatures [B. Lee, "Review of the present status of optical fiber sensors," Optical Fiber Technology, Vol. 9, pp. 57-79, 2003]. Recent studies using FBGs in silica fibers has shown promise up-to 1000° C. [M. Winz, K. Stump, T. K. Plant, "High temperature stable fiber Bragg gratings, "Optical Fiber Sensors (OFS) Conf. Digest, pp. 195 198, 2002; D. Grobnic, C. W. Smelser, S. J. Mihailov, R. B. Walker," Isothermal behavior of fiber Bragg gratings made with ultrafast radiation at temperatures above 1000 C," European Conf. Optical Communications (ECOC), Proc. Vol. 2, pp. 130-131, Stockholm, Sep. 7, 2004]. To practically reach the higher temperatures (e.g., 1600° C.) for fossil fuel applications, single crystal Sapphire fiber has been used for Fabry-Perot cavity and FBG formation [H. Xiao, W. Zhao, R. Lockhart, J. Wang, A. Wang, "Absolute Sapphire optical fiber sensor for high temperature applications," SPIE Proc. Vol. 3201, pp. 36-42, 1998; D. Grobnic, S. J. Mihailov, C. W. Smelser, H. Ding, "Ultra high temperature FBG sensor made in Sapphire fiber using Isothermal using femtosecond laser radiation," European Conf. Optical Communications (ECOC), Proc. Vol. 2, pp. 128-129, Stockholm, Sep. 7, 2004]. The single crystal Sapphire fiber FBG has a very large diameter (e.g., 150 microns) that introduces multi-mode light propagation noise that limits sensor performance. An alternate approach [see Y. Zhang, G. R. Pickrell, B. Qi, A. S.-Jazi, A. Wang, "Single-crystal sapphire-based optical high temperature sensor for harsh environments," *Opt. Eng.*, 43, 157-164, 2004] proposed replacing the Sapphire fiber frontend sensing element with a complex assembly of individual components that include a Sapphire bulk crystal that forms a temperature dependent birefringent Fabry-Perot cavity, a single crystal cubic zirconia light reflecting prism, a Glan-Thompson polarizer, a single crystal Sapphire assembly tube, a fiber collimation lens, a ceramic extension tube, and seven 200 micron diameter multimode optical fibers. Hence this proposed sensor frontend sensing element not only has low optical efficiency and high noise generation issues due to its multi-mode versus SMF design, the sensor frontend is limited by the lowest high temperature performance of a given component in the assembly and not just by the Sapphire crystal and zircornia high temperature ability. Add to these issues, the polarization and component alignment sensitivity of the entire frontend sensor assembly and the Fabry-Perot cavity spectral notch/peak shape spoiling due to varying cavity material parameters. In particular, the Sapphire Crystal is highly birefringent and hence polarization direction and optical alignment issues become critical.

An improved packaged design of this probe using many alignment tubes (e.g., tubes made of Sapphire, alumina, stainless steel) was shown in Z. Huang. G. R. Pickrell, J. Xu, Y. Wang, Y. Zhang, A. Wang, "Sapphire temperature sensor coal gasifier field test," SPIE. Proc. Vol. 5590, p. 27-36, 2004. Here the fiber collimator lens for light collimation and the bulk polarizer (used in Y. Zhang, G. R. Pickrell, B. Qi, A. S.-Jazi, A. Wang, "Single-crystal sapphire-based optical high temperature sensor for harsh environments," *Opt. Eng.*, 43, 157-164, 2004) are interfaced with a commercial Conax, Buffalo multi-fiber cable with seven fibers; one central fiber for light delivery and six fibers surrounding the central fiber for light detection. All fibers have 200 micron diameters and hence are multi-mode fibers (MMF). Hence this temperature sensor design is again limited by the spectral spoiling plus other key effects when using very broadband light with MMFs. Specifically, light exiting a MMF with the collimation lens has poor collimation as it travels a free-space path to strike the sensing crystal. In effect, a wide angular spread optical beam strikes the Sapphire crystal acting as a Fabry-Perot etalon. The fact that broadband light is used further multiplies the spatial beam spoiling effect at the sensing crystal site. This all leads to additional coupling problems for the receive light to be picked up by the six MMFs engaged with the single fixed collimation lens since the best Fabry-Perot effect is obtained when incident light is highly collimated, i.e., it has high spatial coherence. Another problem plaguing this design is that any unwanted mechanical motion of any of the mechanics and optics along the relatively long (e.g., 1 m) freespace optical processing path from seven fiber-port to Sapphire crystal cannot be countered as all optics are fixed during operations. Hence, this probe can suffer catastrophic light targeting and receive coupling failure causing in-operation of the sensor. Although this design used two sets of manual adjustment mechanical screws each for 6-dimension motion control of the polarizer and collimator lens, this manual alignment is only temporary during the packaging stage and not during sensing operations. Another point to note is that the tube paths contain air undergoing extreme temperature gradients and pressure changes; in effect, air turbulence that can further spatially spoil the light beam that strikes the crystal and also for receive light processing. Thus, this mentioned design is not a robust sensor probe design when using freespace optics and fiber-optics.

Others such as Conax Buffalo Corp. U.S. Pat. No. 4,794,619, Dec. 27, 1988 have eliminated the freespace light path and replaced it with a MMF made of Sapphire that is later connected to a silica MMF. The large Numerical Aperture (NA) Sapphire fiber captures the Broadband optical energy from an emissive radiative hot source in close proximity to the Sapphire fiber tip. Here the detected optical energy is measured over two broad optical bands centered at two different wavelengths, e.g., 0.5 to 1 microns and 1 to 1.5 microns. Then the ratio of optical power over these two bands is used to calculate the temperature based on prior 2-band power ratio vs. temperature calibration data. This two wavelength band power ratio method was proposed earlier in M. Gottlieb, et. al., U.S. Pat. No. 4,362,057, Dec. 7, 1982. The main point is that this 2-wavelength power ratio is unique over a given temperature range. Using freespace optical infrared energy capture via a lens, a commercial product from Omega Model iR2 is available as a temperature sensor that uses this dual-band optical power ratio method to deduce the temperature. Others (e.g., Luna Innovations, VA and Y. Zhu, Z. Huang, M. Han, F. Shen, G. Pickrell, A. Wang, "Fiber-optic high temperature thermometer using sapphire fiber," SPIE Proc. Vol. 5590, pp. 19-26, 2004.) have used the Sapphire MMF in contact with a high temperature handling optical crystal (e.g., Sapphire) to realize a temperature sensor, but again the limitations due to the use of the MMF are inherent to the design.

Additional prior arts in fiber-based sensor designs and processing include: Hae Young Choi, Myoung Jin Kim, and Byeong Ha Lee, "All-fiber Mach-Zehnder type interferometers formed in photonic crystal fiber," Opt. Express 15, 5711-5720, 2007; Hae Young Choi, Kwan Seob Park, Seong Jun Park, Un-Chul Paek, Byeong Ha Lee, and Eun Seo Choi, "Miniature fiber-optic high temperature sensor based on a hybrid structured Fabry-Perot interferometer," Opt. Lett. 33, 2455-2457, 2008; Yan Zhang, Xiaopei Chen, Yongxin Wang, Kristie L. Cooper, and Anbo Wang, "Microgap Multicavity Fabry-Perot Biosensor," J. Lightwave Technol. 25, 1797-1804, 2007; Juncheng Xu, Xingwei Wang, Kristie L. Cooper, and Anbo Wang, "Miniature all-silica fiber optic pressure and acoustic sensors," Opt. Lett. 30, 3269-3271, 2005.

It has long been recognized that SiC is an excellent high temperature material for fabricating electronics, optics, and optoelectronics. For example, engineers have used SiC substrates to construct gas sensors [A. Arbab, A. Spetz and I. Lundstrom, "Gas sensors for high temperature operation based on metal oxide silicon carbide (MOSiC) devices," Sensors and Actuators B, Vol. 15-16, pp. 19-23, 1993]. Prior works include using thin films of SiC grown on substrates such as Sapphire and Silicon to act as Fabry Perot Etalons to form high temperature fiber-optic sensors [G. Beheim, "Fibre-optic thermometer using semiconductor-etalon sensor," Electronics Letters, vol. 22, p. 238, 239, Feb. 27, 1986; L. Cheng, A. J. Steckl, J. Scofield, "SiC thin film Fabry-Perot interferometer for fiber-optic temperature sensor," IEEE Tran. Electron Devices, Vol. 50, No. 10, pp. 2159-2164, October 2003; L. Cheng, A. J. Steckl, J. Scofield, "Effect of trimethylsilane flow rate on the growth of SiC thin-films for fiber-optic temperature sensors," Journal of Microelectromechanical Systems, Volume: 12, Issue: 6, Pages: 797-803, December 2003]. Although SiC thin films on high temperature substrates such as Sapphire can operate at high temperatures, the SiC and Sapphire interface have different material properties such as thermal coefficient of expansion and refractive indexes. In particular, high temperature gradients and fast temperature/pressure temporal effects can cause stress fields at the SiC thin film-Sapphire interface causing deterioration of optical properties (e.g., interface reflectivity) required to form a quality Fabry-Perot etalon needed for sensing based on SiC film refractive index change. Note that these previous works also had a limitation on the measured unambiguous sensing (e.g., temperature) range dictated only by the SiC thin film etalon design, i.e., film thickness and reflective interface refractive indices/reflectivities. Thus making a thinner SiC film would provide smaller optical path length changes due to temperature and hence increase the unambiguous temperature range. But making a thinner SiC film makes the sensor less sensitive and more fragile to pressure. Hence, a dilemma exists. In addition, temperature change is preferably estimated based on tracking optical spectrum minima shifts using precision optical spectrum analysis optics, making precise temperature estimation a challenge dependent on the precision (wavelength resolution) of the optical spectrum analysis hardware. In addition, better temperature detection sensitivity is achieved using thicker films, but thicker etalon gives narrower spacing between adjacent spectral minima. Thicker films are harder to grow with uniform thicknesses and then one requires higher resolution for the optical spectrum analysis optics. Hence there exists a dilemma where a thick film is desired for better sensing resolution but it requires a better precision optical spectrum analyzer (OSA) and of course thicker thin film SiC etalons are harder to make optically flat. Finally, add to these issues the Fabry-Perot cavity spectral notch/peak shape spoiling due to varying cavity material parameters that in-turn leads to deterioration in sensing resolution.

Material scientists have also proposed non-contact laser assisted ways to sense the temperature of optical chips under fabrication. Here, both the chip refractive index change due to temperature and thermal expansion effect have been used to create the optical interference that has been monitored by the traditional Fabry-Perot etalon fringe counting method to deduce temperature. These methods are not effective to form a real-time temperature sensor as these prior-art methods require the knowledge of the initial temperature when fringe counting begins. For industrial power plant applications, such prior knowledge is not possible, while for laboratory material growth and characterization, prior knowledge is possible. As shown in this application, our sensor designs solve this problem and no longer need the initial temperature data as real-time fringe counting is not used. Prior works in this general laser-based materials characterization field include: F. C. Nix & D. MacNair, "An interferometric dilatometer with photographic recording," AIP Rev. of Scientific Instruments (RSI) Journal, Vol. 12, February 1941; V. D. Hacman, "Optische Messung der substrate-temperature in der Vakuumaufdampftechnik," Optik, Vol. 28, p 115, 1968; R. Bond, S. Dzioba, H. Naguib, J. Vacuum Science & Tech., 18(2), March 1981; K. L. Saenger, J. Applied Physics, 63(8), Apr. 15, 1988; V. Donnelly & J. McCaulley, J. Vacuum Science & Tech., A 8(1), January/February 1990; K. L. Saenger & J. Gupta, Applied Optics, 30(10), Apr. 1, 1991; K. L. Saenger, F. Tong, J. Logan, W. Holber, Rev. of Scientific Instruments (RSI) Journal, Vol. 63, No. 8, August 1992; V. Donnelly, J. Vacuum Science & Tech., A 11(5), September/October 1993; J. McCaulley, V. Donnelly, M. Vernon, I. Taha, AIP Physics Rev. B, Vol. 49, No. 11, 15 Mar. 1994; M. Lang, G. Donohoe, S. Zaidi, S. Brueck, Optical Engg., Vol. 33, No. 10, October 1994; F. Xue, X. Yangang, C. Yuanjie, M. Xiufang, S. Yuanhua, SPIE Proc. Vol. 3558, p. 87, 1998.

For extreme temperature measurement, classic black body radiation optical detector, also known as pyrometers [see D. P. Dewitt and G. D. Nutter, Theory and Practice of Radiation Thermometry, Wiley, New York, 1988], also provide a valuable alternative to high temperature TCs. Nevertheless, pyrometer readings are best suited for metal surface temperature measurements where hot body material composition is well known, unlike hot gas mixtures in turbines where emissivity values can vary and access to large apertures (optical windows are limited). Nevertheless, pyrometry, including multi-band pyrometry [see D. Ng and G. Fralick, "Use of a multiwavelength pyrometer in several elevated temperature aerospace applications," Rev. Sci. Instru., Vol. 72, No. 2, pp. 1522-1530, February 2001] could potentially provide a good coarse temperature assessment in gas turbines.

SUMMARY DESCRIPTION OF THE INVENTION

This patent application discloses three new long life time all-Silicon Carbide (SiC) probe designs for extreme temperature and pressure sensing, such as for use in gas turbines of power plants. Probe 1 design for temperature-only sensing uses a single crystal SiC optical chip encased in a sintered SiC material probe. Probe 2 design uses a part exposed SiC optical chip that allows both temperature and pressure sensing as it allows direct contact of gas pressure with optical chip while keeping part of the optical SiC chip internal to the sintered SiC probe structure. Probe 3 design uses a mostly exposed SiC optical chip within a sintered SiC assembly to form a pressure-only probe.

An optical wedge is used in the pressure connector on the probe cooler end. The high temperature handling wedge eliminates multiple unwanted optical reflections from the window from interfering with the interferometric optical signal produced by the thermally sensitive SiC etalon chip. The optical wedge acting as the optical window in the probe pressure connector also forms the preferred vacuum seal in the probe.

This application also discloses two new hybrid signal processing techniques to allow fault-tolerant extreme temperature sensing. The first method combines the wavelength peak-to-peak (or null-to-null) (can be many peaks or nulls) collective spectrum spread measurement with the classic etalon wavelength peak/null shift measurement to form a coarse-fine temperature measurement using broadband spectrum monitoring. Specifically, this method combines the Sellemeir equation-based wavelength tuned spectral measurement for coarse temperature sensing with the classic wavelength peak/ null shift etalon method within one free-spectral range to enable the fine temperature measurement, thus making a coarse-fine temperature sensor using all-SiC.

The all-SiC probe design frontend also forms a stable emissivity Black-body radiator and monitoring the shift in its radiation spectrum due to temperature changes makes the classis pyrometer. Hence, the second technique in this application combines all-SiC pyrometry with thick SiC etalon laser interferometry within a free-spectral range to form a coarse-fine temperature measurement sensor. Specifically, the method combines all-SiC pyrometry for coarse temperature measurement with classic single wavelength laser etalon interferometry for fine temperature measurement to form a coarse-fine temperature sensor using all-SiC. This hybrid method also uses a novel fine wavelength tuning of laser wavelength with its positive or negative slope for optical power to eliminate a dual-temperature ambiguity within each fine temperature resolution of the single wavelength etalon optical response with a 360 degree optical phase shift due to temperature change.

In addition, Radio Frequency (RF) notch filtering techniques is used to improve the sensitivity of the temperature measurement where fine spectral shift or spectrum measurements are needed to deduce temperature as in part of the hybrid signal processing techniques in this application. The RF beat signal can be produced by various methods including simultaneously using two phase locked tuned lasers as the input optical source to the all-SiC sensor.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Accuracy, reliability, and long-life times are much sought after and essentially critical parameters for sensors measuring temperature and pressure in gas turbines of coal-fired power plants. Recently, N. A. Riza et. al has proposed and demonstrated the concept of a new hybrid class of sensor [see N. A. Riza, M. A. Arain, F. Perez, "Harsh Environments Minimally Invasive Optical Sensor using Freespace Targeted Single Crystal Silicon Carbide," IEEE Sensors Journal, Vol. 6, No. 3, pp. 672-685, June 2006] that intrinsically contains the scientific and engineering fundamentals to meet the accuracy, reliability, and long-life time features sought by gas turbine manufacturers. The front-end that is optically read to enable a sensing operation is made of a thick (e.g., 400 microns) single crystal SiC material that is optically flat and mechanically robust for handling high (e.g., 160 atms) pressures and high temperatures (e.g., 1600° C.). The SiC material itself is robust to chemical attack with excellent thermal properties for handling extreme temperatures. As the temperature changes, the SiC Optical Path Length (OPL) changes due to refractive index and thermal expansion changes leading to the spatially localized point-position retroreflected optical power varying in a near sinusoidal fashion. Because of the near infrared wavelength (1550 nm) high refractive index (e.g., 2.57) of SiC, the chip acts as a natural two beam interferometer, allowing phase-based linear signal processing to extract unambiguous temperature data via two wavelength data acquisition as demonstrated and described in detail to 1000° C. Measuring optical power data instantaneous phase and 2-wavelength phase shift can produce a unique temperature measurement.

Furthermore, the same optical chip can provide independent pressure measurement data as the chip acts like a clamped-edge model mechanical plate that physically deforms like a bending mirror, thus forming a changing magnification imaging system between the chip plane and the transceiver position imager plane [see N. A. Riza, F. N. Ghauri, and F. Perez, "Wireless pressure sensor using laser targeting of silicon carbide," Optical Engineering, Vol. 46, No. 1, January 2007]. Therefore by simply measuring the magnification change of the received global strike (i.e., illuminate full chip area vs. point zone like for temperature) retroreflected beam, the external pressure can be measured. In effect, one can design an all-SiC probe such that both gas temperature and pressure can be measured from the same sensor simply by using either localized or spatially global reading of the SiC chip, leading to an all-in-one hybrid temperature-pressure sensor design. These early results show the expected potential of using all-SiC probe for developing a new generation of temperature and pressure sensors for fossil fuel power plant extreme environments, hence the focus of this application.

Overall, the sensor innovation stems from the hybrid theme. First, both wired optics and wireless optics is used to extract the chip temperature data. Wireless optics is used to access the chip in the very hot extreme conditions gas zone where all other wired optical and electrical connections fail or suffer serious long-term reliability issues. On the other hand, the sensor deploys low loss efficient wired glass single-mode fiber-optics where it can naturally handle much lower temperatures, i.e., at the cooler external part of the combustor where standard optical and electrical packaging have long life-times. Hence, a hybrid optical interconnection is formed that is robust to extreme temperatures and takes advantage of the pointing accuracy of laser beams. Active alignment is also deployed to keep the laser beam on target. In effect, a robust longer life-time sensor design is formed.

Second and most importantly, the single crystal SiC optical chip is embedded in a sintered SiC tube assembly as proposed by N. A. Riza in earlier works, forming a Coefficient of Thermal Expansion (CTE) matched all-SiC frontend probe. Specially, a hybrid materials approach is used, namely, combining single crystal SiC chip with a sintered SiC housing material, again stressing the hybrid theme. Therefore, because chip and host material are CTE matched, one can expect optimal handling of extreme thermal ramps and temperatures leading to a mechanically robust probe design for long life time operations.

As presented by N. A. Riza in earlier related stated works, the all-SiC probe inner passage for the laser beam is designed to operate preferably with a partial vacuum (e.g., 25 inch-Hg), thus removing air turbulence effects due to the environment such as gas turbine that normally would make the receive beam hop around on the optical receiver such as a camera or point photo-detector. This simple innovation of holding a partial vacuum in the probe also prevents heat transfer of gas induced SiC chip temperature drift through air in the tube.

Because thermal conductivity of the SiC material is high (e.g., 120 W/m-° C.), the example 400 micron thick 1 cm×1 cm square SiC entire optical chip based on our earlier test results reaches the same temperature in under 33 ms and so any zone of the optical chip can be targeted to read the estimated gas temperature. This indeed is a very positive result and forms the basis for designing new frontend probe designs for long life-time operations in combustors, and hence is used in this application.

Figures 1A, 1B:
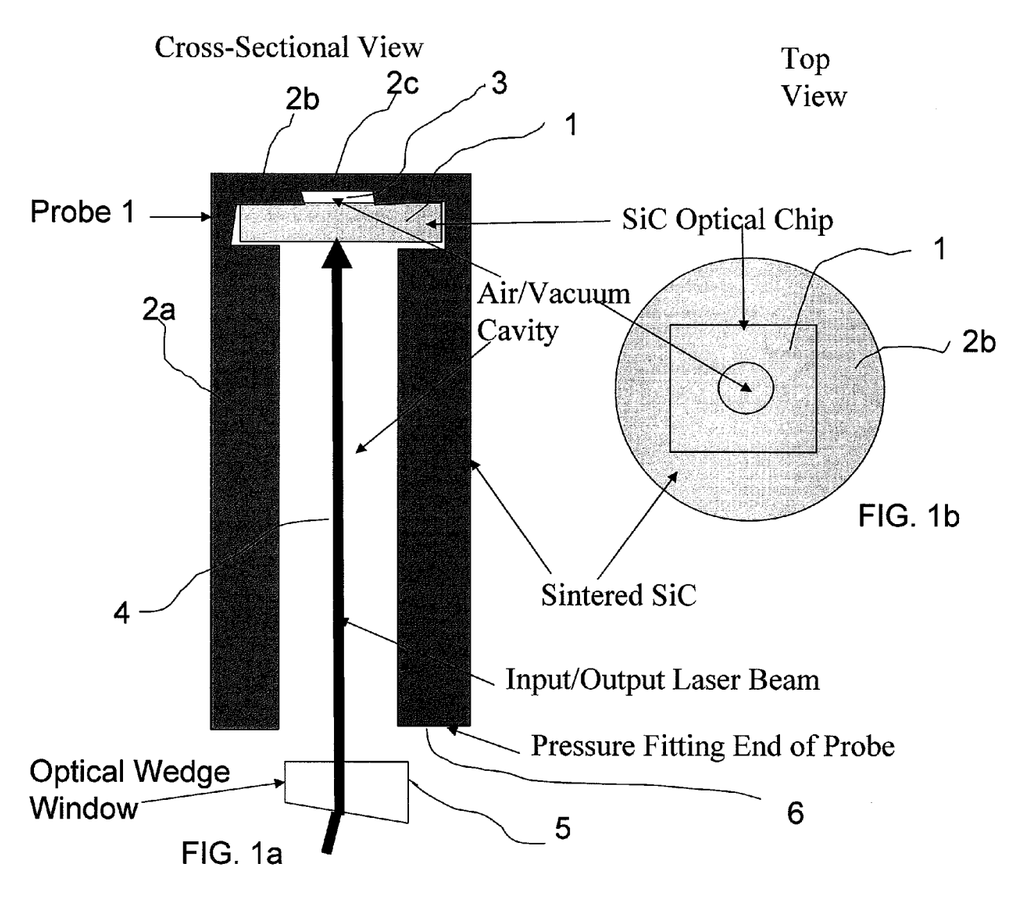
FIGS. 1a and 1b are cross-sectional and top plan views, respectively, of one embodiment of the invention showing an all-SiC Probe 1 frontend design optimized for temperature measurement.

Referring now to FIGS. 1a and 1b, a first embodiment of the Probe 1 frontend design is shown. This design is intended for a temperature-only measuring probe to operate over long life-times in the extreme environment of a combustor with temperatures reaching 1600° C. Note that the sintered SiC material tube 2a and cover 2b is in physical contact with a large fraction of the SiC optical chip 1 surface area, leading to fast heat transfer between outside gas temperature and optical chip 1 via sintered SiC material 2 with matched CTEs. The sintered SiC material cover 2b over the chip 1 is of small thickness (e.g., 2 mm) over the outer part of Probe 1 where conductive heat transfer takes place. The central part 2c of the sintered SiC cover 2b is thinner, forming a small (e.g., 800 micron) thick air cavity 3 that can be vacuum sealed or filled with an inert gas for convective heat transfer. The purpose of the cavity 3 is to maintain a SiC-air interface for strong Fresnel reflection from the incident laser beam 4. The Probe 1 frontend design makes sure that the single crystal SiC chip 1 stays completely protected inside the sintered SiC cover 2b and tube 2a assembly, thus not directly exposing the top surface of optical chip 1 to the extreme conditions of the combustor. In effect, the life-time of the optical signal is greatly enhanced as on-off optical signal modulation depth drop is protected from the harsh combustor environment.

Another innovative aspect of the probe design in this application is that a wedge-shaped geometry high temperature optical window 5 (not a typical flat entry and exit faces optical window) is deployed in the pressure connector 6 (or cooler) side of the probe. The wedge optic 5 prevents the unwanted multiple surface reflections of the optical window 5 from interfering with the true interferometric optical signal from the SiC optical chip 1 that reads the gas temperature. Example high temperature materials for the wedge 5 include Calsium Flouride (CaF) and Magnesium Flouride (MgF) windows.

The design of Probe 1 is not like protected Thermo-Couple (TC) designs where electrical insulator material (i.e., a high temperature ceramic) is used in the wired junction tip zone to prevent electrical shorting. As electrical insulators and also good thermal insulators, external gas temperature heat transfer to TC junction wires is slowed down. In the case of the all-SiC probe, because SiC has high thermal conductivity, heat transfer between external gas temperatures and internal SiC optical chip 1 through sintered SiC cover 2b happens efficiently.

Figures 2A, 2B:
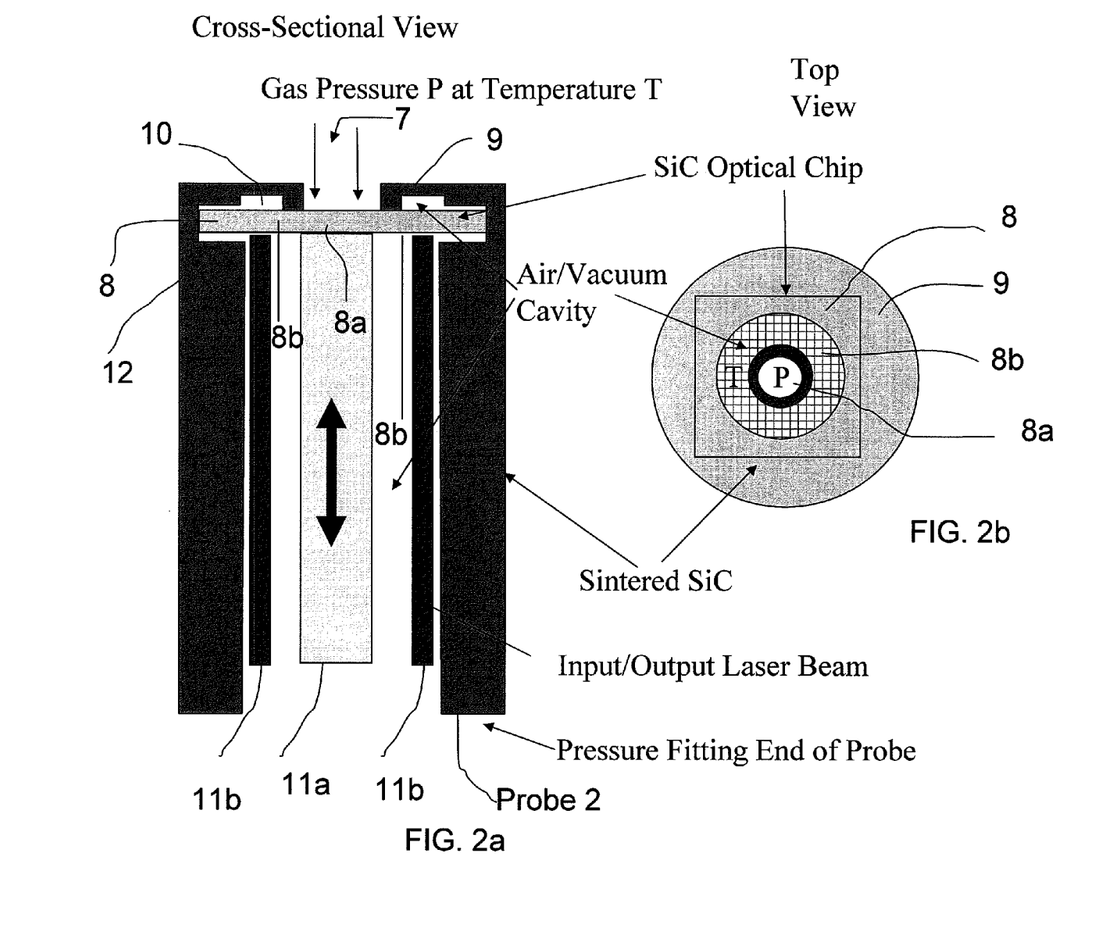
FIGS. 2a and 2b are cross-sectional and top plan views of another embodiment of the invention showing an all-SiC Probe 2 frontend design optimized for simultaneous temperature and pressure measurement in a combustor.

Unlike the Probe 1 design, the Probe 2 design shown in FIGS. 2a and 2b has direct contact with the hot gas 7 in the combustor. In effect, the central part 8a of the SiC optical chip 8 is exposed to the hot gas 7 extreme conditions while the chip side zones 8b are protected with sintered SiC covers 9 with small cavities 10. The optical chip 8, like the experiments on pressure conducted earlier deforms like a convex mirror of changing focal length with increasing relative external pressure (the inside of the probe holds a given vacuum level). Thus depending of the chip 8 boundary conditions (clamped edge or simply supported or a combination), incident light beam 11a on the deforming part 8a of the SiC optical chip 8 suffers beam expansion and a CCD camera can record this image growth with pressure and deduce gas 7 pressure. For example, the beam 11a that hits the central gas 7 exposed part 8a of the chip 8 could suffer the beam expansion given the chip 8 is clamped around the open face of the sintered SiC cover 9. In this case, the central part of the beam off chip zone 8a (labeled with P in FIG. 2 top view) provides the pressure measurement. Note that based on combustor environment operations, the outer surface of the SiC chip 8 will suffer significant optical surface changes leading to significant drop in interferometric modulation depth. Hence, the central 8a part of the chip 8 simply acts as a mirror where light is reflected only from the inner surface of the chip 8, that is the chip surface inside the probe where the laser beam 11a travels. Thus as pressure and temperature change, the central part of the received beam grows in size (not in change of optical power) while the external ring (checkered zone 8b labeled with T in FIG. 2 top view) corresponding to physically separated beams 11b suffers interferometric gray-scale optical power changes based on temperature change. Thus, monitoring the changing optical power on a localized or point level of the retro-reflected ring zone 8b provides the temperature-only data while global size monitoring of the central zone 8a (such as via edge detection image processing methods) gives the pressure-only data. In this simple model case, one assumes that due to material Coefficient of Thermal Expansion (CTE) matching, the temperature changes cause equal expansions of the SiC optical chip 8 and sintered SiC package assembly cover 9 and tube assembly 12, thus preventing any mechanical lens-like deformation of the SiC chip 8, keeping pressure and temperature optical effects decoupled.

Figure 3A:
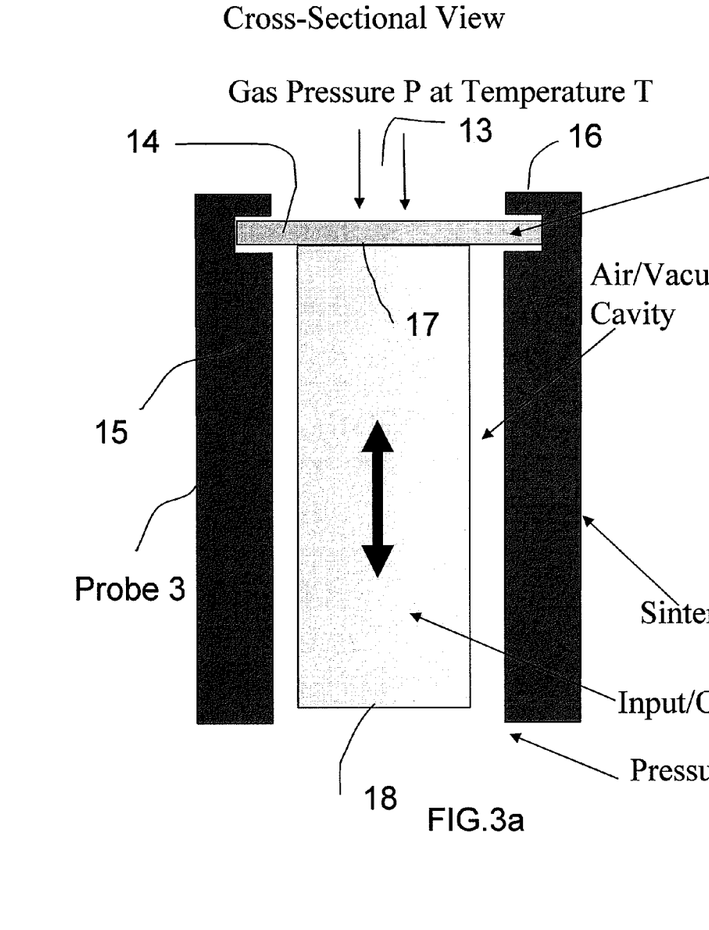
FIGS. 3a and 3b are cross-sectional and top plan views of another embodiment the invention showing Probe 3 design using a mostly exposed SiC optical chip within a sintered SiC assembly to form a pressure-only probe.
Figure 3B:
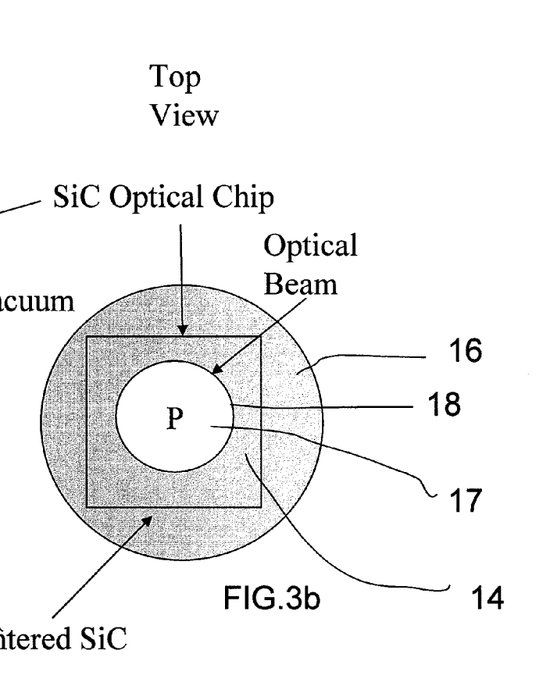

Unlike the Probe 1 design, Probe 3 design shown in FIG. 3 has direct contact with the hot gas 13 in the combustor. The pressure from the gas 13 causes the SiC chip 14 to deform like a convex mirror causing the input beam 18 to undergo beam expansion after hitting the chip 14. By monitoring the received beam size, the pressure is deduced. In the case that the optical fiber is also used to collect the received light, the beam striking the fiber lens is bigger; hence less light is coupled into the fiber. Thus my measuring the optical power coupled into the fiber, one can also deduce the pressure. Note that the chip 14 external surface is exposed to the gas 13 soup of the combustor and hence optically spoils, preventing the chip to act as a thermally tuned etalon, a feature desired for pressure detection where the chip 14 functions simply as a mirror and not an interferometric device. The SiC chip 14 like FIG. 1 and FIG. 2 probe designs is encased in a sintered SiC tube 15 and cover 16 assembly. The laser beam 18 engages the central part 17 of the SiC chip 14 to enable pressure measurement.

Given that long life-time operation probe designs 1,2, and 3 are optimal and robust, one must next design reliable and fault-tolerant signal processing techniques so that sensor measurements are true and robust. Note that the retro-reflected optical power data taken from the thick SiC chip with changing temperature is cyclic with typical unambiguous temperature reading range of 20° C. [see N. A. Riza, M. A. Arain, F. Perez, "Harsh Environments Minimally Invasive Optical Sensor using Freespace Targeted Single Crystal Silicon Carbide," IEEE Sensors Journal, Vol. 6, No. 3, pp. 672-685, June 2006]. To counter this ambiguity problem, two wavelength phase-shift difference based signal processing was proposed and implemented by N. A. Riza (see for example N. A. Riza, et. al, IEEE Sensors Journal, June 2006). This technique requires measurement of optical power data at two pre-defined wavelengths with given start and end temperatures to induce a given relative phase shift and assumes constant optical power cycle periods over entire designed temperature range. In practice, initial SiC material thermo-optic coefficient test data [see N. A. Riza, M. Arain, F. Perez, "6H-Single Crystal Silicon Carbide Thermo-Optic Coefficient Measurements for Ultrahigh Temperatures up-to 1273 K in the telecommunications infrared band," AIP J. of Appl. Phys., Vol. 98, No. 1, 2005] shows that the optical power period reduces (e.g., from ~30° C. at room temp. to ~20° C. at 1000° C.) as temperature increases. Thus, this two wavelength signal processing method, although effective for unambiguous temperature sensing within a chosen range, is not fully robust and leads to inherent processing errors due to limiting material thermo-optical assumptions. Furthermore, any processing sensitive to phase errors requires extra special care when measuring absolute phase, like needing phase-locked loops in electronic systems.

Recently as part of a pending N. A. Riza et. al. patent application Ser. No. 11/923,151 cited in this application's related pending art (i.e., N. A. Riza and F. Perez, "Extreme Temperature Optical Sensor Designs and Signal Processing," provisional application No. 60/862,709 was filed and dated Oct. 24, 2006 and non-provisional application Ser. No. 11/923,151 was filed and dated Oct. 24, 2007), a novel wavelength tuned technique was proposed and later demonstrated (see N. A. Riza, May 2008 Optics Letters Paper) that provides a direct unambiguous reading of the SiC chip temperature without using phase-based signal processing [see N. A. Riza and M. Sheikh, "Silicon carbide based extreme environment temperature sensor using wavelength tuned signal processing," Optics Letters, Vol. 33, No. 10, pp. 1129-1131, May 15, 2008]. This approach simultaneously exploits the SiC material fundamental Sellmeier equation-based wavelength sensitive refractive index change in combination with the classic temperature dependent refractive index change and the material thermal expansion path-length change to encode SiC chip temperature with wavelength. Specifically, the wavelength spacing between optical minima (or maxima) of the SiC retro-reflected optical spectrum using the proposed theoretical analysis using the Sellmeier equation is given by:

$$\Delta\lambda = \frac{k}{2t\left[\frac{BC}{n_1(\lambda_1^2 - C)^2} + \frac{n_1}{\lambda_1^2}\right]}. \quad (1)$$

This equation 1 (see N. A. Riza, et. al, Optics Letters May 2008 paper) indicates that $\Delta\lambda$ is temperature dependent as SiC etalon thickness t and the refractive index $n_1$ are temperature dependent. Therefore, one needs to compute t(T) and $n_1$. The thickness of the SiC chip is given by $t(T)=[1+\alpha\Delta T]t(T_i)$, where $\alpha$ is the known etalon chip material CTE, $\Delta T=T-T_i$, and $T_i$ is the defined initial temperature. The refractive index $n_1$ of the SiC chip as a function of temperature can be calculated from the measured SiC chip reflectance data. The technique is useful for direct coarse temperature measurement and has been demonstrated from room temperature to 1000° C. using a k=10-peak count wavelength tuned measurement with a 0.31 nm total wavelength change giving a near 60° C. resolution. B and C are the known SiC Sellemier material coefficients.

Figure 4:
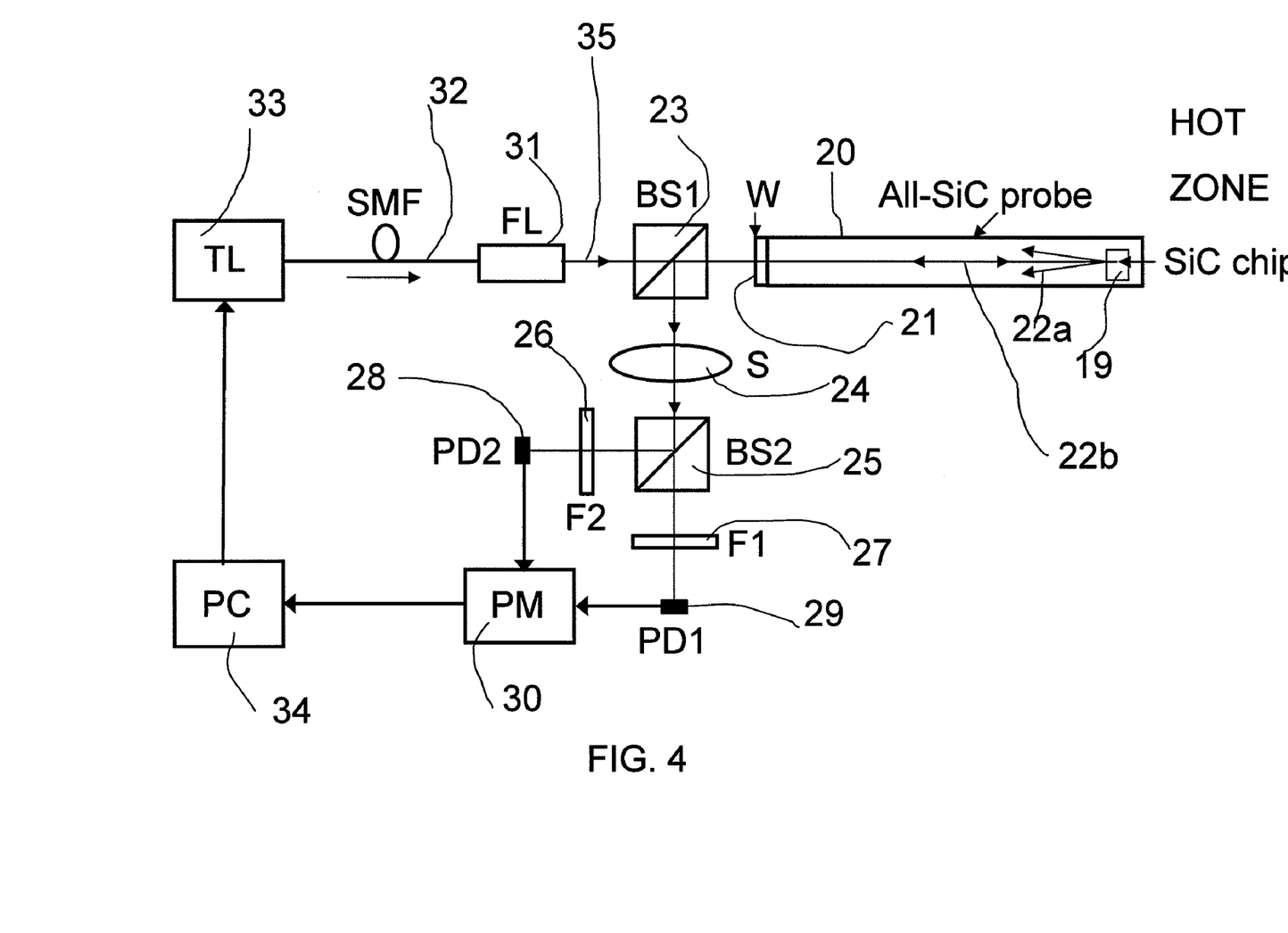
FIG. 4 illustrates a processing system in combination with the inventive probe using both laser interferometry and Black-Body (BB) radiation pyrometry to realize a high resolution temperature sensor.

The earlier N. A. Riza et. al. patent application Ser. No. 11/923,151 mentioned that a high temperature resolution sensor can be realized by combining the traditional Fabry-Perot based temperature sensing via spectrum notch/peak motion tracking within any coarse temperature bin identified by the direct wavelength tuned or $\Delta\lambda$ spectrum measurement method. This application advances this novel hybrid signal processing method via the FIG. 4 sensor design that uses a new wavelength tuned signal processing method to get a coarse wavelength reading and simultaneously uses the classic broadband wavelength peak shift method of thermally sensitive Fabry-Perot (FP) interferometry to obtain a fine temperature reading. In FIG. 4, the TL laser 33 is rapidly tuned to measure the broad spectrum peak-to-peak change via a photodetector (PD1) 29 to give the coarse temperature reading. The optical filter F1 27 helps cut BB radiation outside the tuned laser spectrum (e.g., over 30 nm). In addition, the BB radiation acting as a DC bias level can be removed from the PD1 29 detected signal by AC signal filtering. Using k=60, the system of FIG. 4 should produce a near 10° C. coarse resolution for the wavelength tuned processing method for a 400 micron thick SiC chip 19. Furthermore, a 400 micron thick SiC chip has a typical free optical spectral range limited unambiguous temperature shift reading of ~20° C. which favorably falls under the coarse resolution limit (e.g., <20° C.) of the wavelength tuned method. The fine temperature is measured using the FP peak shift within one free-spectral range (FSR) of the SiC etalon 19 and is measured by dithering/fine tuning the TL laser 33 wavelength to track peak or null shift within one FSR via PD1 29. Thus, the two techniques can be combined to produce a new direct method for measuring the coarse and fine temperature from the all-SiC probes in FIGS. 1 to 3. Because today's optical spectrum analyzers have very high wavelength resolutions (e.g., 0.001 nm), one expects this signal processing method to yield impressive temperature measurement range and resolution results. Both tunable lasers (like TL 33) or broadband light sources can be used for the signal processing.

Fault-tolerant readings are an important feature for any industrial sensor. Keeping this criteria in mind, this application discloses an alternate signal processing method to deduce the temperature from the disclosed probes. Recent experiments conducted highlight a very elegant feature of the all-SiC frontend probe. Namely, the SiC optical chip 19 experiencing very high temperatures acts as a natural Black-Body radiator and use of a lens-optic S 24 in the receiver captures this temperature dependent radiation to produce a coarse temperature optical signal coded with the SiC chip 19 coarse temperature. The SiC optical chip 1 in the Probe 1 design (see FIG. 1) or chip 19 in FIG. 4 is embedded and protected in the sintered SiC package 2a and 2b in FIG. 1 (and package 20 in FIG. 4) and hence it is the SiC optical chip 1 in FIG. 1 (and 19 in FIG. 4) and sintered SiC package cover 2b radiation in FIG. 1 (and 20 in FIG. 4) with fixed emissivity and not the external combustion gas with changing emissivity that is measured by the optical receivers (PD1 29 and PD2 28 in FIG. 4) connected to the probe 1 design. Hence, an all-SiC based pyrometer is formed for temperature measurements. The all-SiC probe based pyrometer can use various classic pyrometry signal processing methods such as single wavelength band, dual wavelength band, and multi-wavelength-band temperature processing methods to enable gas temperature readings in a combustor scenario. Specifically, the combination of all-SiC pyrometry enables coarse temperature measurements (resolution ~20° C.) and laser etalon single wavelength interferometry measurements enables fine temperature measurements. Based on the prior works for a fixed wavelength etalon interferometry (see N. A. Riza, M. A. Arain, F. Perez, "Harsh Environments Minimally Invasive Optical Sensor using Freespace Targeted Single Crystal Silicon Carbide," IEEE Sensors Journal, Vol. 6, No. 3, pp. 672-685, June 2006), a ~20° C. temperature change produces a full optical power cycle at higher temperatures (>1000° C.), indicating a full 360° optical phase (path length) shift in the optical chip due to thermal effects. Because each laser power cycle at a given temperature will have two temperatures where the optical power is the same, this application is a novel wavelength tuned power slope determination method to conclude which temperature of the two temperatures is the true reading. This ambiguity cancellation method uses a slight positive shift in the optical wavelength to see if the optical power increases or decreases. Chip thermal calibration from before will show that for one temperature the power increases (slope is positive) while for the other temperature the power decreases (slope is negative). In this way, this 2-temperature ambiguity in each optical power cycle of the laser reading can be removed. Consecutive maxima or minima are separated by a full coarse temperature bin corresponding to a full 360 degree optical path length change in the chip, so are outside the ambiguity range corresponding to the etalon free spectral optical range. Each laser reading coarse power cycle is equal to or less than the SiC pyrometer temperature resolution reading. Thus, combining both the SiC pyrometer for coarse temperature readings and the laser SiC etalon thermometer for fine temperature readings with the novel power slope signal processing method can result in a higher performance temperature reading from the probe. Note that at the output optical chain for receiving the light from the al-SiC frontend, optical beam splitters can be used to produce two received optical beams. One can place a laser line or infrared optical filter in one output path to block the Black Body Radiation (BBR) so only the laser light is measured for etalon interferometry. On the other receive beam optical path, a laser-line blocking filter can be used to block the laser wavelength, allowing only BBR to get through to the optical detector. Of course, no laser blocking filter can also be used producing a signal that is due both from laser light and BBR. Electronic subtraction can be used to remove the BBR from the laser light since laser light data is recorded at the other receiver port. The laser beam can also be time modulated at a slow rate to use electrical filtering methods to separate the DC and AC electrical signals to obtain the laser light and BBR contributions. Also note that the optical receiver module must use appropriate lens optics for fixed flux transfer efficiency between the remote all-SiC BBR source at the probe hot end and the deployed BBR optical detector at the sensor cold end. A feature of using the all-SiC pyrometer with laser interferometry via the SiC chip etalon is that the all-SiC BBR is self-calibrating via its fixed material radiative signatures, and this feature also allows calibration of the laser-based all-SiC thermometer, making an inherently self-calibrating temperature measurement system via all-SiC processing.

Optical pyrometry based on Planck's BB radiation law has long been used to measure extreme temperatures [Y. A. Levendis, K. R. Estrada, and H. C. Hottel, "Development of multicolor pyrometers to monitor the transient response of burning carbonaceous particles," Rev. Sci. Instrum. Vol. 63, pp. 3608-3622, 1992; U. Anselmi-Tamburini, G. Campari, G. Spinolo, and P. Lupotto, "A two-color spatial-scanning pyrometer for the determination of temperature profiles in combustion synthesis reactions," Rev. Sci. Instrum. Vol. 66, pp. 5006-5014, 1995; D. Ng and G. Fralick, "Use of a multi-wavelength pyrometer in several elevated temperature aerospace applications," Rev. Sci. Instrum. Vol. 72, pp. 1522-1530, 2001]. One-color pyrometry uses a single radiation measurement in a limited spectral band and requires a-priori knowledge of the specific emissivity of the target. Two-color pyrometry removes this emissivity limitation by using the ratio of irradiances at two different spectral bands. This invention employs a hybrid fiber-freespace temperature sensor design using laser targeting of a SiC optical chip embedded inside a sintered SiC tube that forms an all-SiC probe [3]. Hence, FIG. 4 shows how an all-SiC probe can use two-color pyrometry and FP laser interferometry to realize an alternate signal processing chain high resolution extreme environment temperature sensor. Specifically, FIG. 4 also shows an alternate embodiment of the invention using an all-SiC frontend probe (example, FIG. 1 probe design) where both laser interferometry and Black-Body (BB) radiation two color pyrometry is used to realize a high resolution high temperature sensor. Recently, this sensor has been built and reported in N. A. Riza and M. A. Sheikh, "Silicon Carbide-based High Resolution Extreme Environment Hybrid Design Temperature Sensor using Optical Pyrometry and Laser Interferometry," to be submitted to OSA Optics Letters Journal April/May, 2009. For coarse temperature measurement, the SiC chip 19 is used as a BB radiator in a two-color pyrometer configuration. The spectral radiance of an ideal BB radiator is given by Planck's law:

$$I(\lambda, T) = \frac{2hc^2}{\lambda^5} \frac{1}{e^{\frac{hc}{\lambda kT}} - 1}. \quad (2)$$

$\lambda$ is the emitted radiation wavelength, T is the BB temperature in Kelvins, h is the Planck's constant, c is the speed of light, and k is the Boltzmann's constant. In addition to radiation emitted from the SiC chip, background radiation caused by stray furnace light or another heat source is also detected by the photo-detectors when the SiC chip 19 has an open probe design like FIG. 2 and FIG. 3. Optimally, the closed cover FIG. 1 probe design is used in the FIG. 4 sensor. One can assume that the SiC chip and the background radiation source are at the same temperature as SiC has a high (e.g., 120 W/m·K) thermal conductivity. Hence using Eq. 2 under the Wein approximation (i.e., hc>>$\lambda$kT), the ratio of output detected BB radiation powers at the two wavelengths of interest $\lambda_1$ and $\lambda_2$ is given by the well known expression:

$$R = \frac{P_{\lambda_1}}{P_{\lambda_2}} = A_S \left(\frac{\lambda_2}{\lambda_1}\right)^5 \frac{\varepsilon(\lambda_1, T) + a(\lambda_1, T)}{\varepsilon(\lambda_2, T) + a(\lambda_2, T)} \exp\left[-C_2\left(\frac{1}{\lambda_1} - \frac{1}{\lambda_2}\right)\frac{1}{T}\right]. \quad (3)$$

$A_S$ is a sensor-specific constant that takes into account spectral transmittance of the optical sensor system, spectral response and the bandwidth of the F1 optical filter 27 and F2 optical filter 26, and the responsivity of the photo-detectors PD1 29 and PD2 28. $\varepsilon(\lambda,T)$ is the specific emissivity of SiC material, $a(\lambda,T)$ is the product of the emissivity of the background radiation source and its transmission percentage through the system and $C_2$=hc/k. The emissivities also have a weak dependence on $\lambda$ provided there are no sharp emission lines near either of the two working wavelengths. If the two wavelengths are selected close to each other, then the effect of $\varepsilon$ on the ratio is minimal and Eq. 3 can be written as the known expression:

$$\ln R = \alpha + \frac{\beta}{T}. \quad (4)$$

$\alpha$ and $\beta$ are constants that can be determined by sensor calibration. Once $\alpha$ and $\beta$ are determined, a coarse value of temperature can be determined by measuring the ratio R and finding the corresponding value of T from the calibrated R against T curve. For fine temperature measurement, the SiC chip 19 is used as a FP etalon with reflectance given by the known expression:

$$R_{FP} = \frac{R_1 + R_2 + 2\sqrt{R_1 R_2} \cos\varphi}{1 + R_1 R_2 + 2\sqrt{R_1 R_2} \cos\varphi}. \quad (5)$$

$R_1$ and $R_2$ are the classic Fresnel Power coefficients for the SiC-air interface given by $R_1$=$R_2$=$[(1-n)/(1+n)]^2$ and $\phi$=$(4\pi/\lambda)n(T)t(T)$. At temperature T, n(T) is the SiC chip 19 refractive index at laser 33 wavelength $\lambda$ and t(T) is the chip 19 thickness. The reflected laser 33 power P($\lambda$, T) is proportional to $R_{FP}$ and has a sinusoidal behavior with $\phi$. The change in P due to change in $\lambda$ can be written as:

$$\frac{dP}{d\lambda} = \frac{dP}{d\varphi}\frac{d\varphi}{d\lambda} = -\frac{4\pi}{\lambda^2}n(T)t(T)\frac{dP}{d\varphi}. \quad (6)$$

Eq. 6 implies that if dP/d$\lambda$ is positive, i.e., the reflected power increases with an increase in wavelength, then dP/d$\phi$ would be negative and vice versa. The normalized SiC chip 19 reflected laser light power $P_{norm}$ is given by:

$$P_{norm} = \frac{P - P_{min}}{P_{max} - P_{min}}. \quad (7)$$

$P_{max}$ and $P_{min}$ are the localized maximum and minimum power values. To determine a given T, first the two-color pyrometer is used to find a coarse value of temperature within one $2\pi$ cycle of the $P_{norm}$ against $\phi$ curve. Next, within that $P_{norm}$ cycle, the normalized reflected power is measured at a fixed laser wavelength $\lambda$=$\lambda_L$ along with the sign of the change in detected power with change in $\lambda$. The exact value of T can then be found from a previously calibrated $P_{norm}$ against T curve at $\lambda_L$ [see N. A. Riza and M. Sheikh, "Silicon-carbide-based extreme environment temperature sensor using wavelength-tuned signal processing," Opt. Lett. Vol. 33, pp. 1129-1131, 2008].

In FIG. 4, BB radiation from the SiC chip 19 and the sintered SiC probe 20 (includes cover and tube) passes through an optical wedge design window W 21. After deflection from the beam-splitter BS1 23, BB radiation 22a and near retro-reflected laser radiation 22b is captured using a given focal length spherical lens S 24 and directed towards another beam splitter BS2 25 and then towards two photo-detectors PD1 29 and PD2 28. Optical filters F1 27 and F2 26 are for example laser line filters having center wavelengths $\lambda_1$ and $\lambda_2$ of 1550±7 nm and 1300±7 nm, respectively. The filters for example can have a Full-Width Half Max (FWHM) bandwidth of 30±7 nm. For laser interferometry the FIG. 4 design uses a tunable laser TL 33 with a wavelength tuning range for example of 1520-1600 nm and peak power of 10 mW. The Fiber Lens FL 31 has a working distance of e.g., 60 cm and $1/e^2$ minimum beam waist diameter of e.g., 0.5 mm formed at the SiC chip 19. Laser light 35 via SMF 32 from the FL 35 strikes the SiC chip 19 ideally at normal incidence and in the return path 22b, is deflected from BS1 23 and BS2 25 and is focused onto PD1 29. TL 33 is for example set to $\lambda_L$=1550 nm. Optical power meter PM 30 readings are taken with TL 33 on and with TL 33 off. Given that the FIG. 4 sensor uses pyrometry for coarse temperature measurement, using the Wein approximation can be justified and leads to simpler signal processing. A coarse value of the temperature can simply be found by measuring R and finding the corresponding temperature T value using the linear fit from the ln T vs 1/T calibration curve. The resolution of the pyrometer depends on the smallest change in optical power that can be detected by PD1 29 and PD2 28 (with laser off) based on the noise present in the system. Note that this coarse temperature resolution is to be sufficient to identify the correct $2\pi$ cycle for fine temperature sensing. With the TL 33 on, the PD1 29 power is measured that includes both laser reflected power as well as the BB radiation power. The laser reflected power, however, is typically much greater than the radiation power and is normalized by simply tuning the wavelength to find localized power maxima and minima values and using Eq. 7 to find $P_{norm}$. Also, by tuning the wavelength, the direction of the change in power with wavelength is determined in accordance with Eq. 6 to distinguish between the two halves of the $2\pi$ cycle. The T resolution for this laser technique (and sensor) is also determined by the smallest change in optical power detected by PD1 29 (with laser on) based on the noise in the system.

These novel sensor signal processing techniques reduce erroneous temperature readings from the all-SiC probes. Specifically, a factor of two or higher fault-tolerance is added to the sensor temperature reading using the two hybrid signal processing methods, allowing double checks of the true temperature reading. Different physical sensing mechanisms are deployed to enable these measurements, adding higher reliability to the all-SiC probe sensor. The physics of materials and optics are engaged with electrical engineering signal processing methods to construct signal processing chains that are redundant and provide multiple temperature readings.

Another novel technique in this application is the use of thermally tuned all-SiC etalon Radio Frequency (RF) notch filtering to track the RF notch on an RF spectrum analyzer to detect the temperature of the SiC etalon chip. Note that two finely tuned phase-locked lasers can be used as the sensor input light source to produce the mm-wave RF beat note that gives the thermally tuned notch location that is monitored on the RF spectrum analyzer. Hence, a temperature sensor using thick SiC chip can be formed by monitoring the RF notches (or peaks) along with the optical spectrum notches (or peaks) and their spectral shifts. This invention of using RF spectral signal processing in combination with optical spectrum processing and measurement with a thermally coded optical etalon such as a single crystal SiC chip is also part of this application.

In summary, this application introduces new powerful all-SiC probe designs and fault-tolerant signal processing techniques that provide a new capability in solving the need for providing reliable temperature and pressure sensors for gas turbines in clean coal-fired power plants that will operate at much higher firing temperatures of >1450° C.

The invention claimed is:

1. A temperature sensor comprising:
a hollow cylindrical housing formed of silicon carbide (SiC);
a SiC optically sensitive chip mounted adjacent one end of said housing;
a cover of SiC attached to said one end of said housing and overlaying at least a portion of an upper surface of said chip;
means for projecting a light beam through said housing onto a second surface of said chip opposite said upper surface;
means for detecting at least a portion of the light beam that is reflected from said chip; and
processing means for determining a temperature of said chip from said reflected portion of said light beam.

2. The temperature sensor of claim 1 wherein said cover fully overlays said upper surface of said chip and includes an undercut cavity defining a chamber over a central portion of said upper surface.

3. The temperature sensor claim 1 wherein said cover comprises an annular member having a central opening for exposing a portion of said upper surface of said chip.

4. The temperature sensor of claim 1 wherein the housing is formed of sintered SiC.

5. The temperature sensor of claim 4 wherein said light projecting means comprises a tunable laser.

6. The temperature sensor of claim 5 and including an optical wedge-shaped window positioned in a path of said light beam.

7. The temperature sensor of claim 6 wherein the window seals an end of said housing opposite said end where said chip is mounted.

8. The temperature sensor of claim 7 wherein the processing means includes a photodetector for measuring broad spectrum peak-to-peak change in said reflected light beam as said laser is tuned to determine coarse temperature reading.

9. The temperature sensor of claim 8 wherein the processing means includes another photodetector to track optical peak shifts within one Free-Spectral Range to determine fine temperature reading.

10. The temperature sensor of claim 4 wherein said light projecting means comprises a broadband laser.

11. The temperature sensor of claim 1 wherein the SiC chip comprises a single crystal chip.

12. The temperature sensor of claim 8 wherein the processing means responds to black-body radiation from the SiC chip and the closed housing to determine coarse temperature using pyrometry.

13. The temperature sensor of claim 12 wherein the processing means detects reflected laser light spectrum peak shifts to determine fine temperature values.

14. The temperature sensor of claim 13 and including another lens operatively associated with the processing means for receiving and focusing the black-body radiation towards at least one of said photo-detectors.

15. The temperature sensor of claim 5 wherein said laser comprises a pair of fine tuned phase-locked lasers for generating a mm-wave RF beat note that produces a thermally tuned notch location monitorable on an RF spectrum analyzer to detect the temperature of the SiC chip.

16. The temperature sensor of claim 15 wherein RF signal processing is combined with optical spectrum processing to detect high temperature from an SiC single crystal chip.

* * * * *